United States Patent
Theogaraj et al.

(10) Patent No.: US 11,552,927 B1
(45) Date of Patent: Jan. 10, 2023

(54) DYNAMIC HOST CONFIGURATION PROTOCOL LEASE ALLOTMENT

(71) Applicant: Hewlett Packard Enterprise Development LP, Houston, TX (US)

(72) Inventors: Isaac Theogaraj, Bangalore Karnataka (IN); Abhinesh Mishra, Bangalore Karnataka (IN); Gopal Gupta, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/450,349

(22) Filed: Oct. 8, 2021

(51) Int. Cl.
| | |
|---|---|
| *G06N 20/00* | (2019.01) |
| *H04W 76/25* | (2018.01) |
| *H04L 61/5014* | (2022.01) |
| *H04L 43/067* | (2022.01) |
| *H04L 43/0882* | (2022.01) |
| *H04L 61/5076* | (2022.01) |

(52) U.S. Cl.
CPC ........ *H04L 61/5014* (2022.05); *H04L 43/067* (2013.01); *H04L 43/0882* (2013.01); *H04L 61/5076* (2022.05)

(58) Field of Classification Search
CPC ............... H04L 61/5014; H04L 43/067; H04L 43/0882; H04L 61/5076
See application file for complete search history.

(56) References Cited

U.S. PATENT DOCUMENTS

| | | | |
|---|---|---|---|
| 7,080,132 B2 | 7/2006 | Cheshire | |
| 7,814,311 B2 | 10/2010 | Convery et al. | |
| 8,015,271 B2 | 9/2011 | McKeown et al. | |
| 8,615,591 B2 | 12/2013 | Droms et al. | |
| 2002/0099814 A1 | 7/2002 | Mastrianni | |
| 2006/0159071 A1 | 7/2006 | Monteiro | |
| 2016/0219017 A1 | 7/2016 | Kolhi et al. | |
| 2019/0238501 A1 | 8/2019 | Chuu | |
| 2019/0297102 A1 | 9/2019 | Davis, III et al. | |
| 2020/0259740 A1* | 8/2020 | Wetterwald | H04L 45/302 |
| 2021/0019648 A1* | 1/2021 | Backas | G06N 20/00 |
| 2022/0070962 A1* | 3/2022 | Perrone | H04W 24/02 |

FOREIGN PATENT DOCUMENTS

| | | |
|---|---|---|
| WO | WO-03065685 A1 | 8/2003 |

* cited by examiner

*Primary Examiner* — Schquita D Goodwin
(74) *Attorney, Agent, or Firm* — Hewlett Packard Enterprise Patent Department (57) ABSTRACT

In an example, a Dynamic Host Configuration Protocol (DHCP) lease request from a client device connected to a network is received. Based on the DHCP lease request, an Internet Protocol (IP) address is assigned to the client device for a lease time. A first lease renewal request is received. A probability of utilization for a lease time block is predicted based on a historical lease pattern, device characteristics, traffic information, and DHCP information. Based on a combination of the probability of utilization and a reward value, the lease time block is allotted for lease renewal. For each allotment, the reward value is adjusted based on deployment characteristics and traffic load in the network, and a network connection duration of the client device. A normalized reward value for the lease time block is determined based on reward values for the lease time block over multiple allotments.

20 Claims, 5 Drawing Sheets

DYNAMIC HOST CONFIGURATION PROTOCOL LEASE ALLOTMENT

BACKGROUND

A computer network may include devices that use Internet Protocol (IP) for communications. An IP address may be assigned to each of the devices in the computer network. IP addresses are assigned to a device either dynamically as they join the network or may be static based on the configuration of the hardware/software of the device. Dynamic IP addresses may be assigned to a device by a Dynamic Host Configuration Protocol (DHCP) server. DHCP allows devices to share an IP address range on a network.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Generally, DHCP is a network management protocol used on an IP network for automatically assigning IP addresses and other communication parameters to devices connected to the network using a client-server architecture. DHCP eliminates the need for individually configuring devices manually. A DHCP server may assign IP addresses to devices connected to a network using DHCP. In an example, the DHCP server may be implemented as a combination of hardware and software in a network switch or router or a separate computing device. The network may include multiple DHCP servers.

When a client device, such as a laptop, a computer, a smart phone, etc., connects to the network, it may broadcast a DHCP discovery message in the network to fetch a DHCP server in the network. The DHCP server may have a pool of IP addresses which it may assign to requesting client devices. The DHCP server may respond to the DHCP discovery message by sending a DHCP offer message. The DHCP offer message may include an IP address available to be assigned to the client device, a lease time associated with the IP address, and an IP address of the DHCP server. The lease time refers to a time duration for which assignment of the IP address to the client device remains valid. The client device may request for renewal of the lease of the IP address. If the lease is not renewed by the client device before expiry of the lease time, the IP address may be assigned to another device after the lease time gets expired. On receiving the DHCP offer message, the client device may send a DHCP request message to the DHCP server accepting the IP address available to be leased to the client device. In response to receiving the DHCP request message, the DHCP server may make an entry with a client identifier, such as a Media Access Control (MAC) address of the client device and associate the IP address offered with the client identifier and the lease time.

With the proliferation of devices connecting to the network, managing the pool of IP addresses in the DHCP server may be challenging. The lease time for which an IP address is assigned to a client device needs to be optimally selected for efficient use of the pool of IP addresses. In general, once the DHCP server assigns an IP address to a client device, the IP address remains assigned to the client device for the lease time until expiry even if the client device may not be active (e.g., in sleep mode) or may be logged out of the network. Thus, if a lease time for an IP address assigned to the client device is longer than a duration for which the client device remains active or connected to the network, the IP address assigned to the client device may remain unnecessarily blocked for a greater time which may lead to unavailability of IP addresses for new devices joining the network. On the other hand, if the lease time for an IP address assigned to the client device is shorter than a duration for which the client device stays connected to the network, then the client device may request for lease renewal. If the client device stays connected to the network for a long time, it may request frequent lease renewals which may lead to increased network traffic and may choke the network. Thus, in the scenarios discussed above, the lease assignment may be inefficient and it may be challenging to optimize DHCP lease times.

In the present disclosure, techniques of managing DHCP lease times for client devices are disclosed. In an example, a network device, such as a DHCP server, may receive a DHCP lease request from a client device. In an example, the client device may send the DHCP lease request in response to receiving a DHCP offer message from the DHCP server. The DHCP lease request may indicate acceptance of an IP address offered to the client device in the DHCP offer message. Based on the DHCP lease request, the network device may assign the IP address to the client device for a lease time. In an example, the lease time may be included in the DHCP offer message. The network device may receive a first lease renewal request from the client device. In an example, the client device may send the first lease renewal request on expiry of half of the lease time. The network device may predict a probability of utilization for a lease time block, from a plurality of lease time blocks, based on a historical lease pattern, device characteristics, traffic information, and DHCP information associated with the client device.

In an example, the prediction may be performed using an artificial neural network (ANN). Based on a combination of the probability of utilization and a reward value for the lease time block, the network device may allot the lease time block to the client device for lease renewal of the IP address. In an example, the reward value is derived from a reinforcement learning (RL) model coupled to the ANN. For each allotment of the lease time block, the network device may adjust the reward value for the lease time block based on deployment characteristics of the network, traffic load in the network, and a network connection duration of the client device. Based on reward values for the lease time block over a plurality of allotments, the network device may determine a normalized reward value for the lease time block. Use of a combination of the probability of utilization adjusted based on the reward values allows for better prediction of the probability of utilization of the lease time blocks and in turn results in more accurate allotment of lease time blocks for lease renewal.

Further, with the present techniques, since the probability of utilization is predicted using client-specific parameters, such as a historical lease pattern, device characteristics, traffic information, and DHCP information associated with the client device, the allotment of lease time block may be selectively optimized for different clients. Also, since the probability of utilization is combined with the reward value adjusted based on deployment characteristics of the network, traffic load in the network, and a network connection duration of the client device, overall network performance is also taken into account while allotment of the lease time block for renewal. Thus, with the present techniques lease renewals of IP addresses may be efficiently managed using a combination of the probability of utilization and the reward value.

The described systems and methods may be implemented in various network devices implementing DHCP in a network. Although, the description herein is with reference to a DHCP server implemented in a network environment, the methods and described techniques may be implemented in other type of devices, such as gateways, routers, etc., implementing DHCP functionalities, albeit with a few variations. Various implementations of the present subject matter have been described below by referring to several examples.

The above systems and methods are further described with reference to FIG. 1 to FIG. 5. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Figure 1:
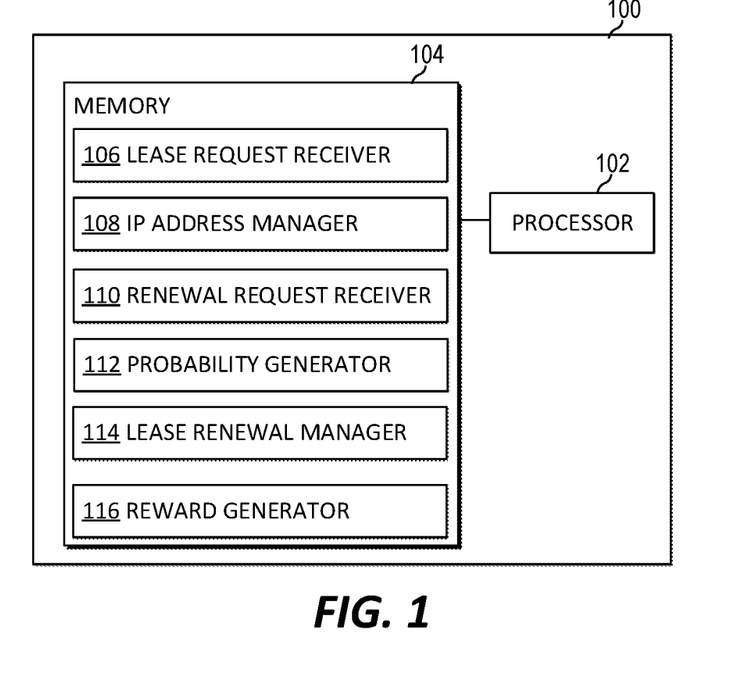
FIG. 1 is a block diagram of an example network device for DHCP lease allotment.

FIG. 1 is a block diagram of an example network device 100 for DHCP lease allotment. In an example, the network device 100 may be a DHCP server, a router, a gateway, etc. The network device 100 may include a processor 102 and a memory 104 that may be coupled to each other through a communication link (e.g., a bus). Processor 102 may include a single or multiple Central Processing Units (CPU) or another suitable hardware processor(s), such as a network ASIC. The memory 102 may store machine readable instructions which may executed by processor 102. The memory 104 may include any suitable combination of volatile and/or non-volatile memory, such as combinations of Random Access Memory (RAM), Read-Only Memory (ROM), flash memory, and/or other suitable memory.

The memory 104 stores instructions to be executed by the processor 102 including instructions for lease request receiver 106, IP address manager 108, renewal request receiver 110, probability generator 112, lease renewal manager 114, and reward generator 116.

The processor 102 may execute the lease request receiver 106 which causes the network device 100 to receive a DHCP lease request from a client device connected to a network. In an example, the client device may broadcast the DHCP lease request in the network, in response to receiving a DHCP offer message from the network device 100. The DHCP offer message may include an IP address offered to the client device and a lease time associated with the IP address. The client device may broadcast the DHCP lease request in the network accepting the IP address for the lease time.

In an example, the lease time in the DHCP offer message may be fixed or predefined. For example, a client device connecting to the network for the first time may be offered a lease time of 24 hours. The predefined lease time may be defined by a network administrator based on a type of network deployment, such as a campus network, public network, private network, etc. and a type of the client device. For example, for an office network, the predefined lease time offered to office desktops may be higher as compared to lease times offered to guest smartphones. In another example, the lease time in the DHCP offer message may be determined by the network device using Machine Learning (ML) techniques based on different parameters, such as date and time when the client device connects to the network, location of the client device, such as guest area, employee area etc., device type of the client device, such as laptop, desktop, smartphone, etc.

The processor 102 may execute the IP address manager 108 which causes the network device 100 to assign an IP address to the client device for the lease time, based on the DHCP lease request. In an example, in response to receiving the DHCP lease request, the network device 100 may assign the IP address offered to the client device for the lease time mentioned in the DHCP offer message. In an example, assigning the IP address may include mapping the IP address to an identifier of the client device, such as a MAC address of the client device. The MAC address of the client device may be included in the DHCP lease request.

The processor 102 may execute the renewal request receiver 110 which causes the network device 100 to receive a first lease renewal request from the client device. The first lease renewal request may include the MAC address of the client device, the IP address of the client device, remaining lease time, etc. In an example, the client device may send the first lease renewal request to the network device100, in response to expiry of half of the lease time associated with the IP address assigned to the client device. The lease renewal request is indicative of the client device requesting renewal of lease of the IP address of the client device. In an example, if the lease time for which the IP address was assigned is 2 hours, the client device may send the first lease renewal request after 1 hour of the IP address being assigned.

The processor 102 may execute the probability generator 112 which causes the network device 100 to predict a probability of utilization for a lease time block from a plurality of lease time blocks, based on a historical lease pattern, device characteristics, traffic information, and DHCP information associated with the client device. In an example, a maximum time duration for which lease renewal may be granted to the client device is divided into equal time slots. For example, the maximum time duration for which the lease renewal may be granted may be 24 hours which can be divided into 48 time slots, each time slot corresponding to 30 minutes of lease time. A lease time block may represent lease time as multiples of such a time slot. In this example, there may be 48 lease time blocks. Thus, a first least time block may include one time slot, a second least time block may include two time slots, and a forty eighth lease time block may include 48 time slots. The probability of utilization may be calculated for each of the lease time blocks.

Some example parameters which may indicate historical lease pattern of the client device may include total number of lease renewals in the past for the client device, lease start time, lease expiry time, and number of consecutive lease renewals in the past, etc. Some example parameters which may indicate device characteristics of the client device may include operating system of the client device, device type based on device fingerprinting, VLAN category for the client device, e.g., internal devices, guest device, and management devices, and client location. Some example parameters which may indicate traffic information associated with the client device may include web traffic category accessed by the client device based on the source of the traffic, e.g., direct traffic, referral traffic, search traffic, etc., reputation of traffic accessed by the client device based on security profile of the hostname which may be maintained by different Deep Packet Inspection (DPI) classification algorithms, e.g., high risk, low risk, safe, etc., and percentage of bandwidth consumed by the client device based on bitrate of the incoming traffic. Some example parameters which may indicate DHCP information associated with the client device may include DHCP options request list based on the client device's preferences, e.g., subnet mask to be applied on the network interface of the client device requesting for an IP address, default router or last resort gateway for the network interface of the client device, preferred Domain Name Server (DNS) to include in the IP configuration for name resolution, and requested lease time for this IP address and load on DHCP server in the network device.

In an example, the probability of utilization of each of the plurality of lease time blocks is predicted using an Artificial Neural Network (ANN). In the examples described herein, an artificial neural network (ANN) refers to an information processing system comprising interconnected processing elements that are modeled on the structure of a biological neural network. The interconnected processing elements may be referred to as "artificial neurons" or "nodes". The ANN may comprise a plurality of artificial neurons, which may be organized into a plurality of layers. In an instance, the ANN may comprise multiple layers: an input layer, hidden layer(s), and an output layer. In an instance, the ANN may be a feedforward neural network wherein connections between the units may not form a cycle. In the feedforward neural network, the information may move in one direction, from the input layer, through the hidden layer(s), and to the output layer. There may be no cycles or loops in the network.

In another example, the ANN may be based on a backpropagation architecture. The backpropagation may be used to train the ANN. When an input vector is presented to the ANN, it may be propagated forward through the ANN, layer by layer, until it reaches the output layer. The output of the network may be compared to the desired output, using a loss function, and an error value may be calculated for each of the artificial neurons in the output layer. The error values may be propagated backwards, starting from the output, until each artificial neuron has an associated error value which roughly represents its contribution to the original output. Backpropagation may use these error values to calculate the gradient of the loss function with respect to weights in the network. This gradient may be provided to an optimization method, which in turn may use it to update the weights to minimize the loss function. As the ANN is trained, the neurons in the intermediate layers may organize themselves in such a way that the different neurons may learn to recognize different characteristics of the total input. After training of an arbitrary input pattern is presented to the ANN, neurons in the hidden layer(s) of the network may respond with an output if the new input contains a pattern that resembles a feature that the individual neurons have learned to recognize during their training.

In the examples described herein, the parameters indicative of historical lease pattern, device characteristics, traffic information, and DHCP information associated with the client device may be provided as an input to the input layer of the ANN. In an example, before providing the parameters to the input layer, the parameters may be encoded to be represented by numerical value(s) using different encoding techniques, such one hot encoding. In another example, the parameters may also be processed by using different dimensionality reduction techniques before providing the parameters to the input layer. The output layer of the ANN may provide a probability of utilization for each of the plurality of lease time blocks. In an example, the output layer is a layer of the ANN before normalization of the probability of utilization for each of the plurality of lease time blocks. In an example, there may be 48 lease time blocks as discussed above and the probability of utilization may be predicted for each of those.

Table 1 below shows an example output from the ANN including probability of utilization for each of the plurality of lease time blocks.

TABLE 1

| Client's MAC address | Probability for first lease time block | Probability for second lease time block | ... | Probability for $N^{th}$ lease time block |
|---|---|---|---|---|
| MAC 1 | 0.001 | 0.08 | ... | 0.04 |
| MAC 2 | 0.01 | 0.002 | ... | 0.07 |
| MAC 3 | 0.007 | 0.08 | ... | 0.005 |
| MAC 4 | 0.002 | 0.07 | ... | 0.06 |

As shown in table 1, for a first client device with MAC 1, the probability of utilization for each of the N lease time blocks is PU=[0.001, 0.08, . . . , 0.04], for a second client device with MAC 2, the probability of utilization for each of the N lease time blocks is PU=[0.01, 0.002, . . . , 0.07], for a third client device with MAC 3, the probability of utilization for each of the N lease time blocks is PU=[0.007, 0.08, . . . , 0.005], and for a fourth client device with MAC 4, the probability of utilization for each of the N lease time blocks is PU=[0.002, 0.07, . . . , 0.06]. Thus, the probability of utilization is predicted for each of the lease time blocks per client device connected to the network.

The processor 102 may execute the lease renewal manager 114 which causes the network device 100 to allot, a lease time block, from the plurality of lease time blocks, to the client device for lease renewal of the IP address. The lease time block is allotted based on a combination of the probability of utilization and a reward value for the lease time block. The reward value of the lease time block may be derived from a Reinforcement Learning (RL) model coupled to the ANN. The reward value refers to a reinforcement signal associated with an action of the RL model, where with each iteration the RL model learns a policy to maximize a normalized reward value of the action. The normalized reward value refers to an adjusted reward value of a lease time block to a notionally common scale and in some examples may include averaging reward values over multiple iterations. In an example, the RL model may be trained based on a feedback of the allotment of the lease time block.

In an example, the RL model may use an exploration-exploitation technique, in which the RL model may operate in an exploration phase or an exploitation phase using an Epsilon-greedy algorithm. In Reinforcement Learning, an agent or decision-maker learns how to map situations to actions so as to maximize a reward. The agent is not explicitly signalled which actions to take, but instead it discovers which action yields the most reward through trial and error. By exploration the agent performs trials of new actions in response to previously known or unknown situations. In exploration phase, the agent may not rely on previous learnings of the RL model to choose an action. Exploration allows the agent to improve its learning about each action, and thereby may lead to long-term benefit by improving the accuracy of the map between the situations and the actions. In the 'exploration' phase, the agent keeps exploring to dynamically find a more appropriate action. In exploitation on the other hand, the agent chooses an action to get the most reward by exploiting the agent's learnings. However, if the agent chooses to exploit its learnings in all or most of the iterations, the agent may not actually get the most cumulative reward in long run since new learnings and improving the accuracy of learning is only possible through exploration. Since the agent cannot perform exploration and exploitation simultaneously, for optimal behavior of the RL model, exploration and exploitation phases need to be balanced. In an example, the epsilon-greedy algorithm provides a method to balance exploration and exploitation by choosing between exploration and exploitation randomly. According to epsilon greedy algorithm, epsilon ($\epsilon$) refers to the probability of choosing to explore. Thus, according to the epsilon-greedy algorithm, a random action may be chosen in an exploration with a probability $\epsilon$ else an action that yields the maximum reward is chosen in an exploitation phase with a probability (1-$\epsilon$). In the exploration phase of the RL model, the processor 102 may execute the lease renewal manager 114 which causes the network device 100 to select, a random lease time block, from the plurality of lease time blocks, for allotment in response to receiving the first lease renewal request.

In some examples, the network device 100 may associate the reward value to each of the plurality of lease time blocks. Say, for the first client device, in a first iteration, the network device 100 may associate reward values to each of the plurality of lease time blocks, e.g., Reward Value (RV)= [0.0003, 0.002, . . . , 0.001], where the reward value for the first lease time block is 0.0003, the reward value for the second lease time block is 0.002, and the reward value for the $N^{th}$ lease time block is 0.001. In some examples, the processor 102 may execute the lease renewal manager 114 which causes the network device 100 to multiply the probability of utilization and the normalized reward value for the lease time block to obtain a renewal probability for the lease time block. Thus, the renewal probability for each of the lease time blocks may be obtained by multiplying the probability of utilization of the lease time block with its corresponding normalized reward value. In an example, for the first client device, Renewal Probability (RP)=PU*RV= [0.001*0.0003, 0.08*0.002, . . . , 0.04*0.001]=[0.0000003, 0.00016, . . . , 0.00004], where the renewal probability of the first lease time block is 0.0000003, the renewal probability of the second lease time block is 0.00016, and the renewal probability of the $N^{th}$ lease time block is 0.00004. In some examples, in an exploitation phase of the RL model, the processor 102 may execute the lease renewal manager 114 which causes the network device 100 to select a lease time block, from the plurality of lease time blocks, having maximum renewal probability for allotment. Thus, in the above example, maximum of [0.0000003, 0.00016, . . . , 0.00004] is determined and the lease time block having the maximum renewal probability may be selected for allotment.

The processor 102 may execute the reward generator 116 to adjust the reward value for a lease time block for each allotment of the lease time block. For each allotment of each of the plurality of lease time blocks, a reward value associated with each of the plurality of lease time blocks is adjusted. The reward value is adjusted based on deployment characteristics of the network, traffic load in the network, and a network connection duration of the client device.

In an example, the processor 102 may execute the reward generator 116 which causes the network device 100 to determine that the network has a sparse deployment of client devices, such as in a home network. In an example, the network device 100 may determine a deployment density of client devices in the network. If the network has a low concentration of client devices, for example, deployment density of client devices is less than 1 client every 3 square meters, then the network device 100 may determine that the network has a sparse deployment of client devices. Further, the processor 102 may execute the reward generator 116 which causes the network device 100 to determine that the network has a high traffic load, i.e., traffic flow rate above a specific threshold. For a network with sparse deployment of client devices or high traffic load, in response to the client device disconnecting from the network before expiry of the allotted lease time block, the processor 102 may execute the reward generator 116 which causes the network device 100 to increase the reward value by a fraction of an unused lease time. The unused lease time corresponds to a duration from the time the client device disconnects from the network to the expiry of the allotted lease time. In an example, the reward value may be increased by a ratio of "Unused lease time/Allotted lease time".

In another example, for a network with sparse deployment of client devices or high traffic load, in response to the network device receiving a second lease renewal request from the client device, the processor 102 may execute the reward generator 116 which causes the network device 100 to decrease the reward value by a predefined penalty. In an example, the predefined penalty is a fixed integer value specified by a network administrator.

For example, in a network with sparse deployment or high traffic load, if the first client device disconnects from the network before expiry of a first lease time block allotted to it, the reward value 0.0003 associated with the first lease time block may be increased. Consider that the first client device disconnects from the network after half of the first lease time block is expired, then the increment in reward value=(Unused lease time/Allotted lease time)=(0.5 lease time block/1 lease time block)=0.5. Thus, the reward value is increased to 0.0003+0.5=0.50003. Alternatively, if the first client device sends a second lease renewal request to the network device 100 indicating that the first client device intends to stay connected to the network after the expiry of the first lease time block, the reward value of the first lease time block is reduced. In an example, the reduction in reward value=0.0003−2=−0.1997. As may be noted, in the above example, a reduction in reward value in response to receiving the second lease renewal request suggests that the reward value is adjusted in favor of higher lease time allotment in order to keep a check on the number of lease renewal requests. As a consequence, the network already having a high traffic load may be prevented from getting choked with frequent lease renewal requests from client devices. Also, since the network has a sparse deployment of client devices, allotting higher lease times to connected clients may not have a significant impact on the DHCP pool of IP addresses available for allotment.

In another example, the processor 102 may execute the reward generator 116 which causes the network device 100 to determine that the network has a dense deployment of client devices, such as an office network or a public network. If the network has a high concentration of client devices, for example, deployment density of client devices is more than 1 client every 1.5 square meter, such as in a conference hall, classroom, lecture hall, auditorium, or sports arena, the network device 100 may determine that the network has a very dense deployment of client devices. In another example, if the network has a deployment density of client devices more than 1 client every 10 square meter, such as in a conference hall, classroom, lecture hall, auditorium, or sports arena, the network device 100 may determine that the network has a dense deployment of client devices. Further, the processor 102 may execute the reward generator 116 which causes the network device to determine that the network has a low traffic load, i.e., traffic flow rate below the specific threshold. For a network with dense deployment of client devices or low traffic load, in response to the client device disconnecting from the network before expiry of the allotted lease time block, the processor 102 may execute the reward generator 116 which causes the network device 100 to decrease the reward value by a fraction of an unused lease time. The unused lease time corresponds to a duration from the time the client device disconnects from the network to the expiry of the allotted lease time. In an example, the reward value may be decreased by a ratio of "Unused lease time/Allotted lease time".

In another example, for a network with dense deployment of client devices or low traffic load, in response to the network device receiving a second lease renewal request from the client device, the processor 102 may the execute reward generator 116 which causes the network device 100 to increase the reward value by a predefined bonus. In an example, the predefined bonus is a fixed integer value specified by a network administrator.

In some examples, in a network with dense deployment or low traffic load, if the first client device disconnects from the network before expiry of the first lease time block allotted to it, the reward value 0.0003 associated with the first lease time block may be decreased. Consider that the first client device disconnected from the network after half of the first lease time block is expired, then the reduction in reward value=(Unused lease time/Allocated lease time)=(0.5 lease time block/1 lease time block)=0.5. Thus, the reward value is reduced to 0.0003−0.5=−0.4997. Alternatively, if the first client device sends a second lease renewal request to the network device 100 indicating that the first client device intends to stay connected to the network after the expiry of the allotted first lease time block, the reward value of the first lease time block is increased. In an example, the reward value is increased to =0.0003+2=2.0003, where the pre-defined bonus is "2". In the above example, increment in the reward value in response to the client device sending the second lease renewal request suggests that the reward value is adjusted in favor of lower lease time allotment in order to prevent unnecessary blocking of IP addresses from the pool of IP addresses available for allotment, since the network already has a dense deployment of client devices. Although the above examples of adjusting the reward value is explained with reference to the first client device and the first lease time block, in other examples the reward values for each lease time block may be similarly adjusted for each client device.

The processor 102 may execute the reward generator 116 which causes the network device 100 to determine the normalized reward value for the lease time block based on reward values for the lease time block over a plurality of allotments. In an example, the reward generator 116 may include instructions for implementing a Reinforcement Learning (RL) model to determine the normalized reward value. In an example, the RL model may use the exploration-exploitation technique to determine the reward value, in which the RL model may operate in an exploration phase or an exploitation phase using an Epsilon-greedy algorithm. The normalized reward value may be determined for each of the plurality of lease time blocks. In an example, the normalized reward value for a lease time block may be calculated as "Total reward value for the lease time block for N iterations/N". In an example, the normalized reward value may be used for determining the renewal probability in a subsequent iteration.

Figure 2:
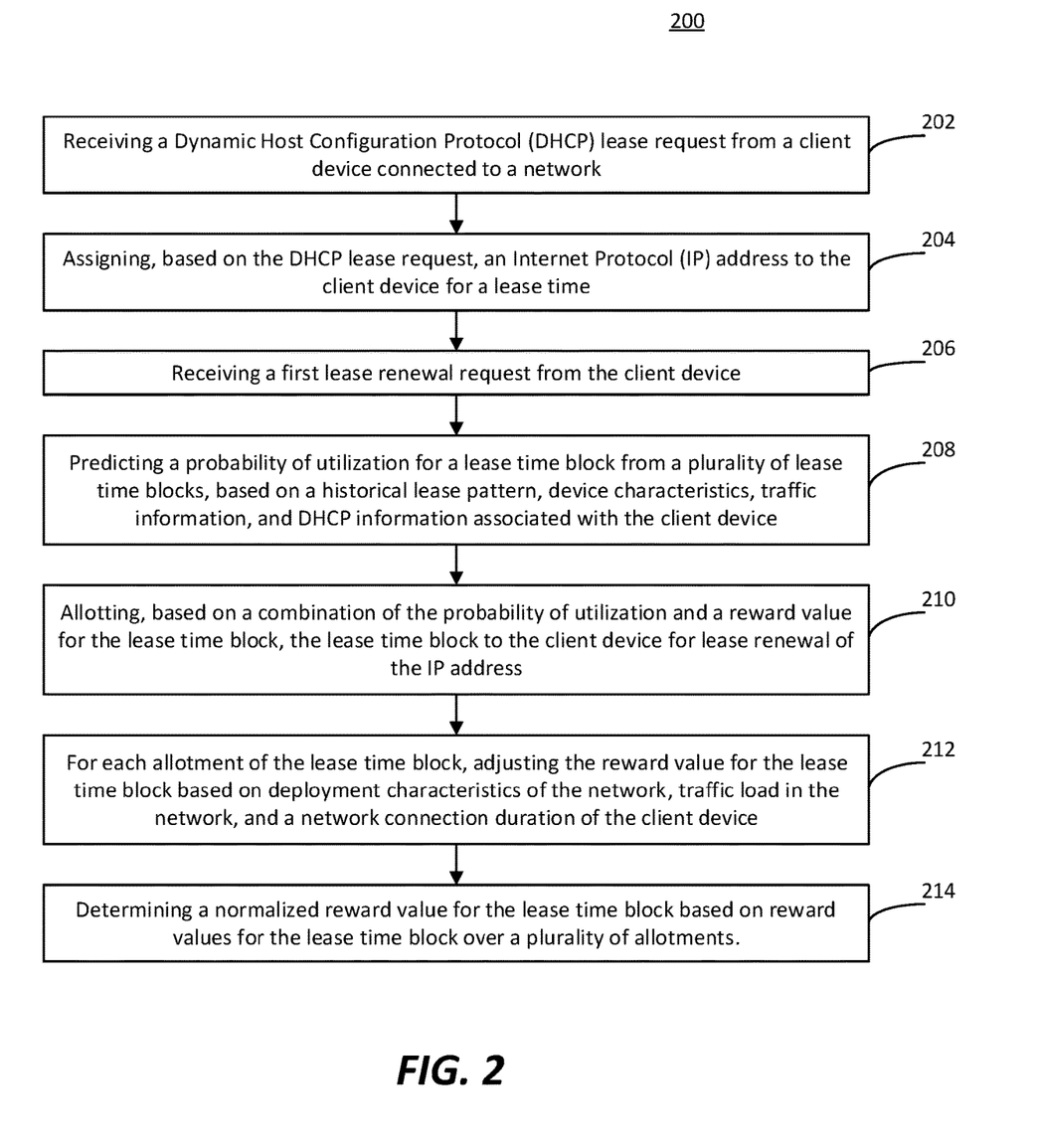
FIG. 2 is a flow diagram of an example method for DHCP lease allotment.

FIG. 2 is a flow diagram of an example method 200 for DHCP lease allotment. The system where method 200 is performed may be similar to network device 100 described above.

Referring to FIG. 2, at block 202, the method 200 may include receiving, by a network device, a DHCP lease request from a client device connected to a network. In an example, the client device may send the DHCP lease request in response to receiving a DHCP offer message from the network device, for example, a DHCP server. At block 204, the method 200 may include assigning, by the network device, the IP address to the client device for the lease time, based on the DHCP lease request from the client device.

At block 206, the method 200 may include receiving, by the network device, a first lease renewal request from the client device. At block 208, the method 200 may include predicting a probability of utilization for a lease time block from a plurality of lease time blocks, based on a historical lease pattern, device characteristics, traffic information, and DHCP information associated with the client device.

At block 210, the method 200 may include allotting a lease time block to the client device for lease renewal of the IP address based on a combination of the probability of utilization and a reward value for the lease time block. The reward value of the lease time block may be derived from a Reinforcement Learning (RL) model coupled to the ANN. At block 212, the method may include adjusting the reward value for the lease time block for each allotment of the lease time block. At block 214, the method 200 may include determining a normalized reward value for the lease time block based on reward values for the lease time block over a plurality of allotments.

Figure 3A:
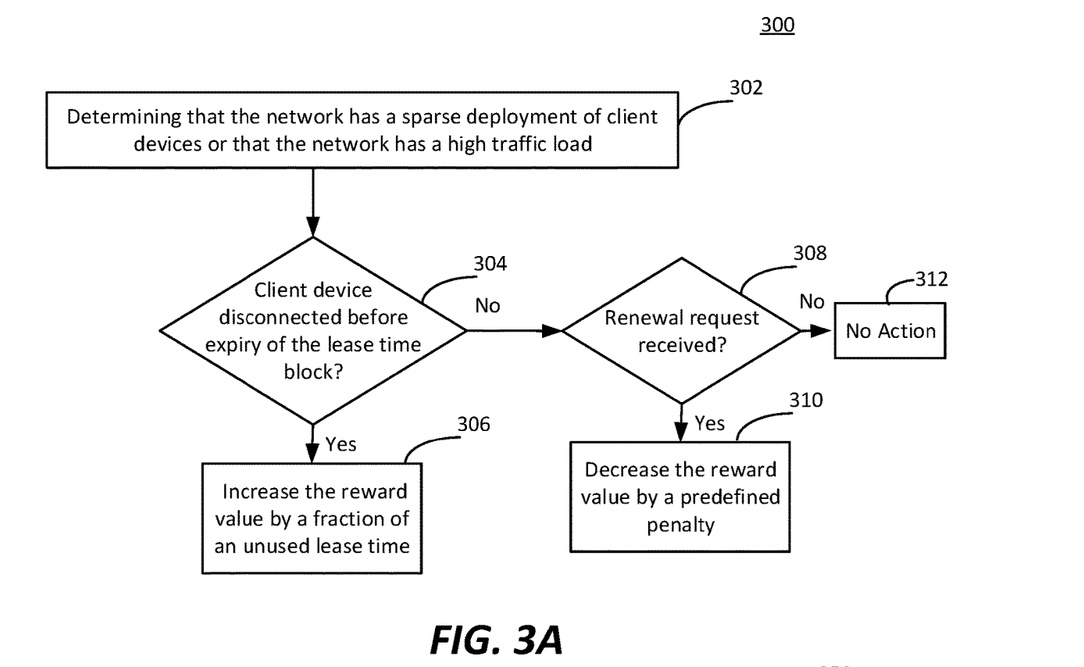
FIG. 3A is a flow diagram of an example method for adjusting a reward value for DHCP lease allotment.

FIG. 3A is a flow diagram of an example method for adjusting a reward value for a lease time block. The system where method 300 is performed may be similar to network device 100 described above. In an example, the method 300 may be implemented in networks having low client density.

Referring to FIG. 3A, at block 302, the method 300 may include determining that the network has a sparse deployment of client devices or that the network has a high traffic load. In an example, the network device may determine that the network has a sparse deployment based on deployment density of client devices in the network. The high traffic load may correspond to a traffic flow rate higher than specific threshold.

On determining that network has a sparse deployment of client devices or that the network has a high traffic load, at block 304, the method 300 may include checking whether the client device is disconnected from the network before expiry of the allotted lease time block. At block 306 ('Yes' branch from block 304), in response to determining that the client device disconnected from the network before expiry of the allotted lease time block, the method 300 may include increasing the reward value by a fraction of an unused lease time.

At block 308 ('No' branch from block 304), in response to determining that the client device is not disconnected from the network before expiry of the allotted lease time block, the method 300 may include checking whether a renewal request is received at the network device. In response to determining that the renewal request is received ('Yes' branch from block 308), at block 310 the method 300 may include decreasing the reward value by a predefined penalty. In response to determining that the renewal request is not received ('No' branch from block 308), at block 312 the lease time may remain unchanged.

Figure 3B:
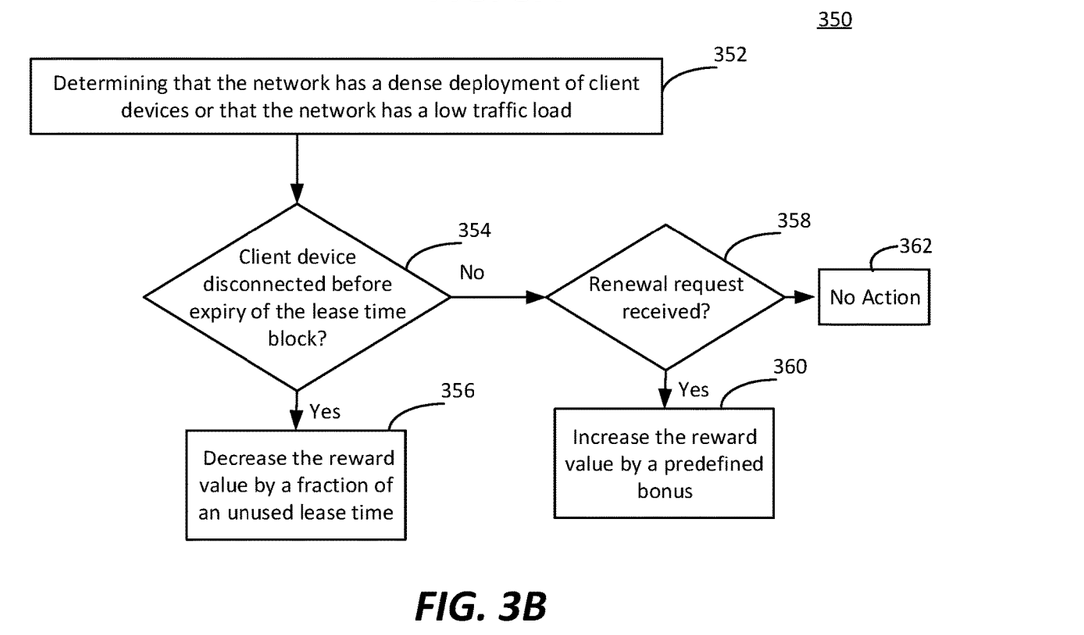
FIG. 3B is a flow diagram of another example method for adjusting a reward value for DHCP lease allotment.

FIG. 3B is a flow diagram of an example method 350 for adjusting a reward value for a lease time block. The system where method 350 is performed may be similar to network device 100 described above. In an example, the method 350 may be implemented in networks having high client density.

Referring to FIG. 3B, at block 352, the method 350 may include determining that the network has a dense deployment of client devices or that the network has a low traffic load. In an example, the network device may determine that the network has a dense deployment based on deployment density of client devices in the network. The low traffic load may correspond to a traffic flow rate in the network lower than a specific threshold.

On determining that network has a dense deployment of client devices or that the network has a low traffic load, at block 354, the method 350 may include checking whether the client device is disconnected from the network before expiry of the allotted lease time block. At block 356 ('Yes' branch from block 354), in response to determining that the client device is disconnected from the network before expiry of the allotted lease time block, the method 350 may include decreasing the reward value by a fraction of an unused lease time.

At block 358 ('No' branch from block 354), in response to determining that the client device is not disconnected from the network before expiry of the allotted lease time block, the method 350 may include checking whether a renewal request is received at the network device. In response to determining that the renewal request is received ('Yes' branch from block 358), at block 360 the method 350 may include increasing the reward value by a predefined bonus. In response to determining that the renewal request is not received ('No' branch from block 358), at block 362 the lease time may remain unchanged.

Figure 4:
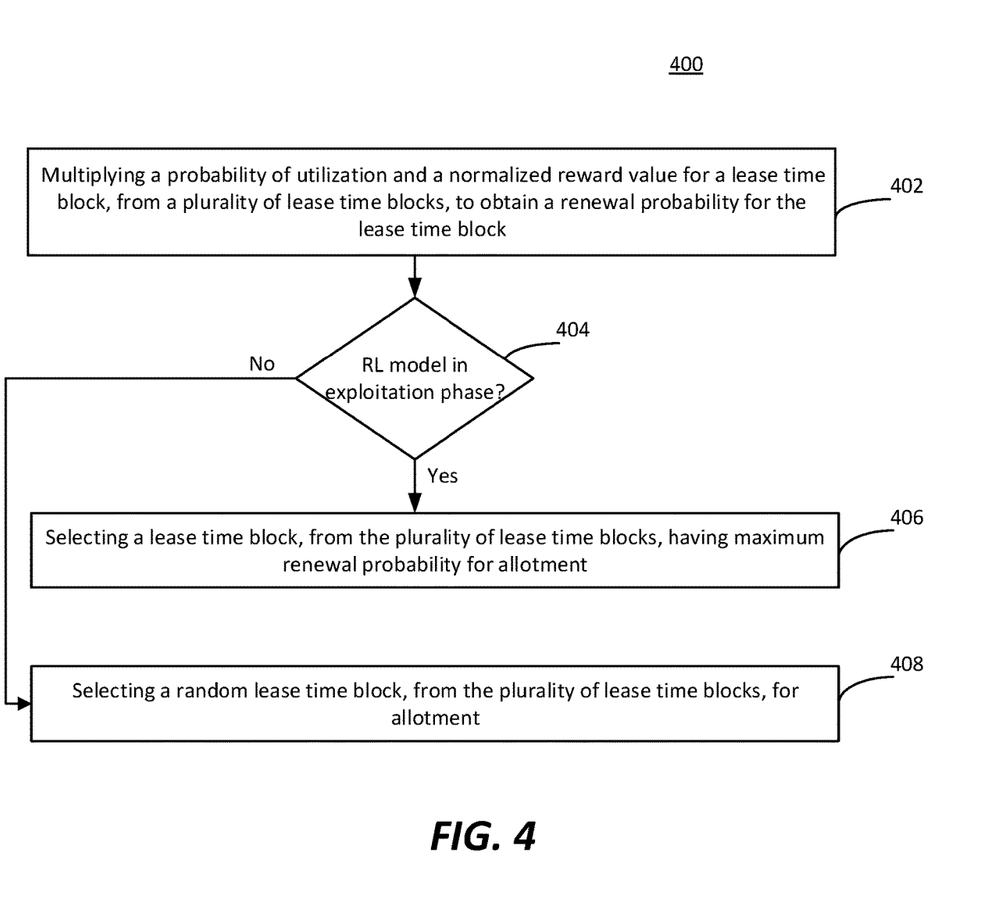
FIG. 4 is a flow diagram of another example method for allotting a lease time block for lease renewal.

FIG. 4 is a flow diagram of an example method 400 for allotting a lease time block for lease renewal. The system where method 400 is performed may be similar to network device 100 described above.

Referring to FIG. 4, at block 402, the method 400 may include multiplying the probability of utilization and the normalized reward value for the lease time block to obtain a renewal probability for the lease time block. Thus, a renewal probability for each of the plurality of lease time blocks may be determined. At block 404, the method 400 includes checking whether the RL model is in an exploitation phase. In response to determining that the RL model is in the exploitation phase ('Yes' branch from block 404), at block 406, the method 400 may include selecting a lease time block, from the plurality of lease time blocks, having a maximum renewal probability for allotment.

In response to determining that the RL model is not in the exploitation phase ('No' branch from block 404), it may be determined that the RL model is in an exploration phase. In response to determining that the RL model is in the exploration phase, at block 408, the method 400 may include selecting a random lease time block, from the plurality of lease time blocks, for allotment to the client device requesting for lease renewal.

Figure 5:
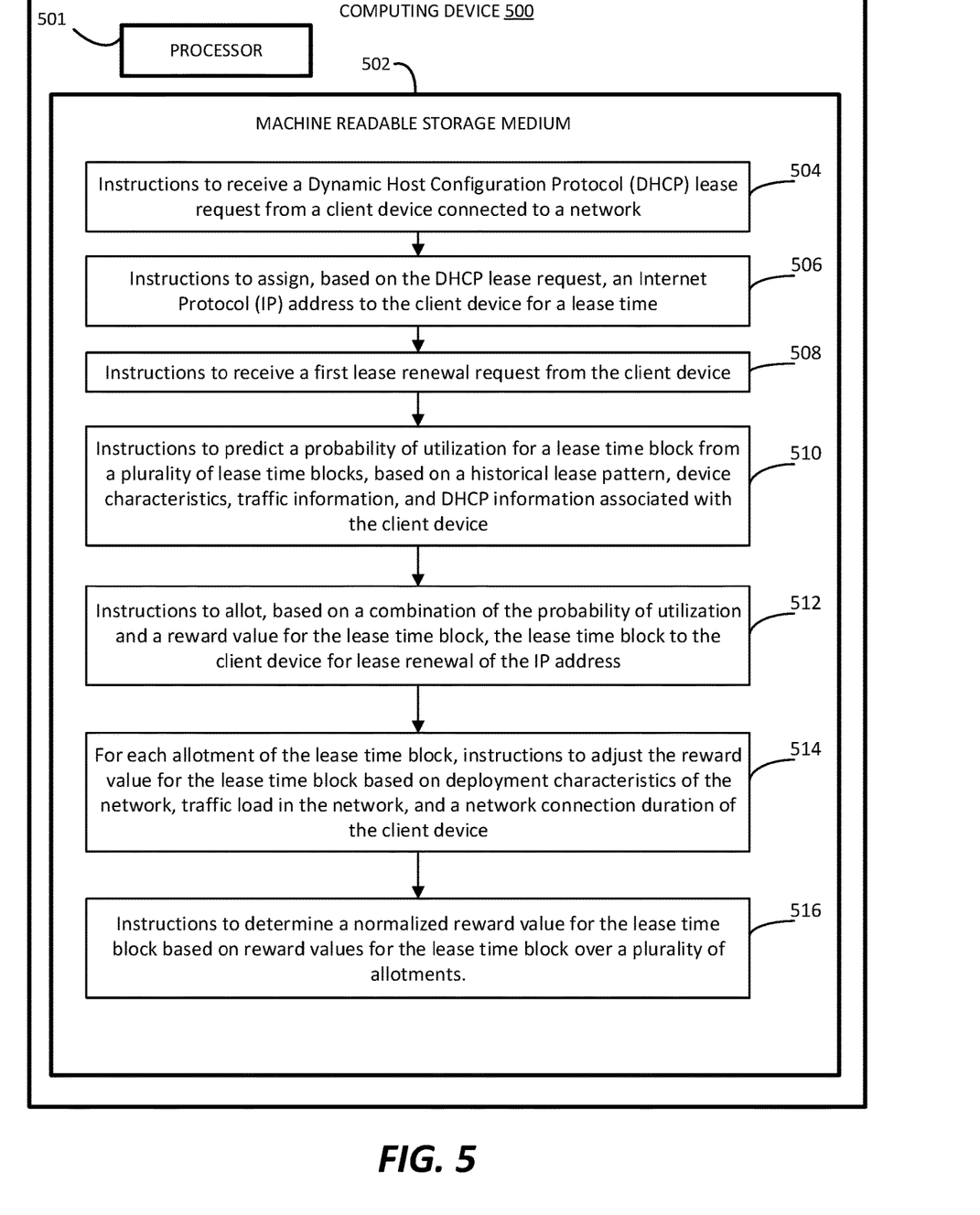
FIG. 5 is a block diagram of an example storage medium storing machine-readable instructions for DHCP lease allotment.

FIG. 5 is an example computing device 500, with a hardware processor 501, and accessible machine-readable instructions stored on a machine-readable medium 502 for implementing one example system, according to one or more disclosed example implementations. In an example, the computing device 500 may be a network device, such as the network device 100 described above in reference to FIG. 1. FIG. 5 illustrates computing device 500 configured to perform instructions 504, 506, 508, 510, 512, 514 and 516 described below. However, computing device 500 may also be configured to perform the flow of other methods, techniques, functions, or processes described in this disclosure, such as, for example the method 300 of FIG. 3, the method 350 of FIG. 3B, and the method 400 of FIG. 4.

A processing element such as processor 501 may contain one or more hardware processors, where each hardware processor may have a single or multiple processor cores. In one embodiment, the processor 501 may include at least one shared cache that stores data (e.g., computing instructions) that are utilized by one or more other components of processor 501. For example, the shared cache may be a locally cached data stored in a memory for faster access by components of the processing elements that make up processor 501. In one or more embodiments, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 5, the processing elements that make up processor 501 may also include one or more of other types of hardware processing components, such as graphics processing units (GPU), application specific integrated circuits (ASICs), field-programmable gate arrays (FPGAs), and/or digital signal processors (DSPs).

The processor 501 may be operatively and communicatively coupled to a memory. The memory may be a non-transitory computer readable medium, such as the machine readable storage medium 502, configured to store various types of data. For example, the memory may include one or more storage devices that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain aspects, the non-volatile storage devices may be used to store overflow data if allocated RAM is not large enough to hold all working data. The non-volatile storage devices may also be used to store programs that are loaded into the RAM when such programs are selected for execution.

The machine-readable storage medium 502 of FIG. 5, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

The machine readable medium 502 includes instructions 504 that, when executed by the processor 501, cause a network device to receive a DHCP lease request from a client device connected to a network. The instructions 506 that, when executed by the processor, cause the network device to assign, based on the DHCP lease request, an IP address to the client device for a lease time. Further, instructions 508 when executed by the processor 501, cause the network device to receive a first lease renewal request from the client device. The instructions 510 when executed by the processor 501, cause the network device to predict a probability of utilization for a lease time block from a plurality of lease time blocks, based on a historical lease pattern, device characteristics, traffic information, and DHCP information associated with the client device. The instructions 512 when executed by the processor 501, cause the network device to allot, based on a combination of the probability of utilization and a reward value for the lease time block, the lease time block to the client device for lease renewal of the IP address. For each allotment of the lease time block, the instructions 514 when executed by the processor 501, cause the network device to adjust the reward value for the lease time block based on deployment characteristics of the network, traffic load in the network, and a network connection duration of the client device. Further, the instructions 516 when executed by the processor 501, cause the network device to determine a normalized reward value for the lease time block based on reward values for the lease time block over a plurality of allotments.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ". Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

The invention claimed is:

1. A method comprising:
receiving a Dynamic Host Configuration Protocol (DHCP) lease request from a client device connected to a network;
assigning, based on the DHCP lease request, an Internet Protocol (IP) address to the client device for a lease time;
receiving a first lease renewal request from the client device;
predicting a probability of utilization for a lease time block from a plurality of lease time blocks, based on a historical lease pattern, device characteristics, traffic information, and DHCP information associated with the client device;
allotting, based on a combination of the probability of utilization and a reward value for the lease time block, the lease time block to the client device for lease renewal of the IP address;
for each allotment of the lease time block, adjusting the reward value for the lease time block based on deployment characteristics of the network, traffic load in the network, and a network connection duration of the client device; and
determining a normalized reward value for the lease time block based on reward values for the lease time block over a plurality of allotments.

2. The method of claim 1, wherein adjusting the reward value comprises:
determining that the network has a sparse deployment of client devices or that the network has a high traffic load;
increasing the reward value by a fraction of an unused lease time, in response to the client device disconnecting from the network before expiry of the allotted lease time block; and
decreasing the reward value by a predefined penalty, in response to receiving a second lease renewal request from the client device.

3. The method of claim 1, wherein adjusting the reward value comprises:
determining that the network has a dense deployment of client devices or that the network has a low traffic load;
increasing the reward value by a predefined bonus, in response to receiving a second lease renewal request from the client device; and
decreasing the reward value by a fraction of an unused lease time, in response to the client device disconnecting from the network before expiry of the allotted lease time block.

4. The method of claim 1, wherein allotting the lease time block comprises:
multiplying the probability of utilization and the normalized reward value for the lease time block to obtain a renewal probability for the lease time block;
in an exploration phase of the RL model, selecting a random lease time block, from the plurality of lease time blocks, for allotment; and
in an exploitation phase of the RL model, selecting the lease time block, from the plurality of lease time blocks, having maximum renewal probability for allotment.

5. The method of claim 1, wherein the historical lease pattern is represented by a number of lease renewals in the past for the client device, least start time, lease expiry time, and a number of consecutive lease renewals in the past.

6. The method of claim 1, wherein the traffic information associated with the client device is represented by bandwidth consumption by the client device, reputation of traffic accessed by the client device, and web traffic categories accessed by the client device.

7. The method of claim 1, wherein device characteristics of the client device is represented by device type based on device fingerprinting, operating system of the client device, location of the client device, VLAN category of the client device.

8. The method of claim 1, wherein DHCP information associated with the client device is represented by DHCP options request list and load on DHCP server.

9. A network device comprising:
a processor; and
a non-transitory, computer-readable medium including instructions that, when executed by the processor, cause the network device to:
receive a Dynamic Host Configuration Protocol (DHCP) lease request from a client device connected to a network;
assign, based on the DHCP lease request, an Internet Protocol (IP) address to the client device for a lease time;
receive a first lease renewal request from the client device;
predict a probability of utilization for a lease time block from a plurality of lease time blocks, based on a historical lease pattern, device characteristics, traffic information, and DHCP information associated with the client device;
allot, based on a combination of the probability of utilization and a reward value for the lease time block, the lease time block to the client device for lease renewal of the IP address;
for each allotment of the lease time block, adjust the reward value for the lease time block based on deployment characteristics of the network, traffic load in the network, and a network connection duration of the client device; and
determine a normalized reward value for the lease time block based on reward values for the lease time block over a plurality of allotments.

10. The network device of claim 9, wherein the instructions to adjust the reward value, when executed by the processor, cause the network device to:
determine that the network has a sparse deployment of client devices or that the network has a high traffic load;
increase the reward value by a fraction of an unused lease time, in response to the client device disconnecting from the network before expiry of the allotted lease time block; and
decrease the reward value by a predefined penalty, in response to receiving a second lease renewal request from the client device.

11. The network device of claim 9, wherein the instructions to adjust the reward value, when executed by the processor, cause the network device to:
determine that the network has a dense deployment of client devices or that the network has a low traffic load;
increase the reward value by a predefined bonus, in response to receiving a second lease renewal request from the client device; and
decrease the reward value by a fraction of an unused lease time, in response to the client device disconnecting from the network before expiry of the allotted lease time block.

12. The network device of claim 9, wherein the instructions to allot the lease time block when executed by the processor, cause the network device to:
multiply the probability of utilization and the normalized reward value for the lease time block to obtain a renewal probability for the lease time block;
in an exploration phase of the RL model, select a random lease time block, from the plurality of lease time blocks, for allotment; and
in an exploitation phase of the RL model, select the lease time block, from the plurality of lease time blocks, having maximum renewal probability for allotment.

13. The network device of claim 9 wherein each of the plurality of lease time blocks represent lease time as multiples of a time slot.

14. The network device of claim 9, wherein the historical lease pattern is represented by a number of lease renewals in the past for the client device, least start time, lease expiry time, and a number of consecutive lease renewals in the past.

15. The network device of claim 9, wherein the traffic information associated with the client device is represented by bandwidth consumption by the client device, reputation of traffic accessed by the client device, and web traffic categories accessed by the client device.

16. The network device of claim 9, wherein device characteristics of the client device is represented by device type based on device fingerprinting, operating system of the client device, location of the client device, VLAN category of the client device.

17. The network device of claim 9, wherein DHCP information associated with the client device is represented by DHCP options request list and load on DHCP server.

18. A non-transitory computer readable medium including instructions that, when executed by a processor, cause a network device to:
receive a Dynamic Host Configuration Protocol (DHCP) lease request from a client device connected to a network;
assign, based on the DHCP lease request, an Internet Protocol (IP) address to the client device for a lease time;
receive a first lease renewal request from the client device;
predict a probability of utilization for a lease time block from a plurality of lease time blocks, based on a historical lease pattern, device characteristics, traffic information, and DHCP information associated with the client device;
allot, based on a combination of the probability of utilization and a reward value for the lease time block, the lease time block to the client device for lease renewal of the IP address;
for each allotment of the lease time block, adjust the reward value for the lease time block based on deployment characteristics of the network, traffic load in the network, and a network connection duration of the client device; and
determine a normalized reward value for the lease time block based on reward values for the lease time block over a plurality of allotments.

19. The non-transitory computer readable medium as claimed in claim 18, wherein the instructions to adjust the reward value, when executed by the processor, cause the network device to:
determine that the network has a sparse deployment of client devices or that the network has a high traffic load;

increase the reward value by a fraction of an unused lease time, in response to the client device disconnecting from the network before expiry of the allotted lease time block; and decrease the reward value by a predefined penalty, in response to receiving a second lease renewal request from the client device.

20. The non-transitory computer readable medium as claimed in claim 18, wherein the instructions to adjust the reward value, when executed by the processor, cause the network device to:

determine that the network has a dense deployment of client devices or that the network has a low traffic load;

increase the reward value by a predefined bonus, in response to receiving a second lease renewal request from the client device; and decrease the reward value by a fraction of an unused lease time, in response to the client device disconnecting from the network before expiry of the allotted lease time block.

* * * * *